Oct. 4, 1949.   R. W. LONG   2,483,500
APPARATUS FOR OBTAINING X-RAY DIFFRACTION PATTERNS
Filed July 18, 1947
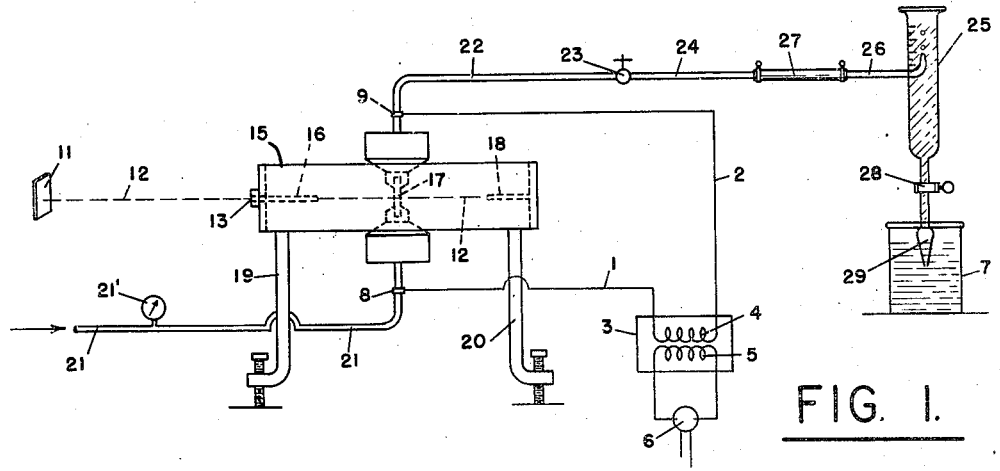
FIG. 1.
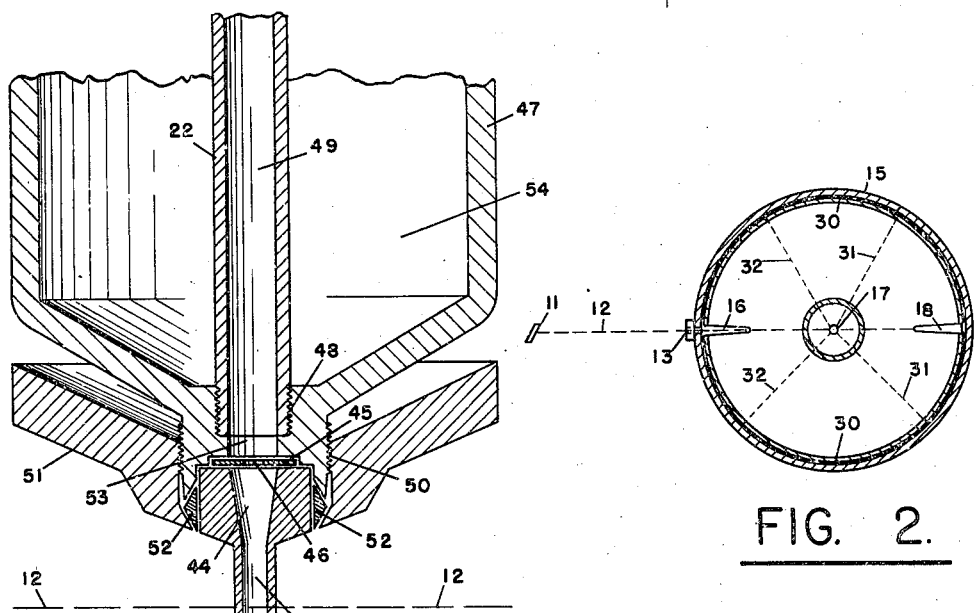
FIG. 2.
FIG. 3.
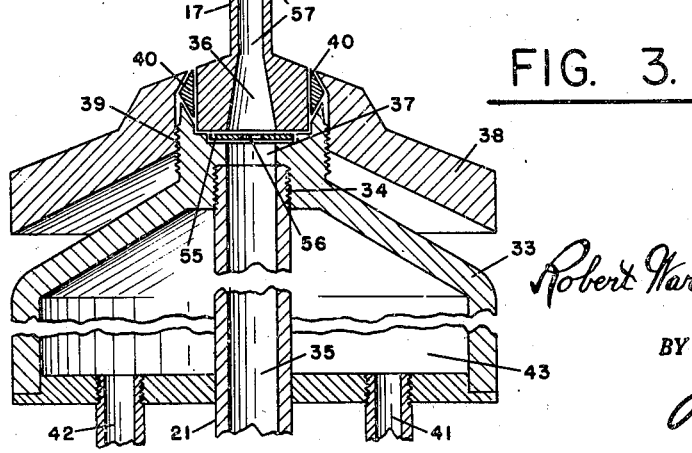
Robert Warren Long INVENTOR.
BY
J. D. McLean
ATTORNEY.

Patented Oct. 4, 1949

2,483,500

UNITED STATES PATENT OFFICE 2,483,500

APPARATUS FOR OBTAINING X-RAY DIFFRACTION PATTERNS

Robert Warren Long, Winter Park, Fla., assignor, by mesne assignments, to Standard Oil Development Company, Elizabeth, N. J., a corporation of Delaware Application July 18, 1947, Serial No. 761,791

3 Claims. (Cl. 250—151)

The present invention relates to a method and apparatus for obtaining X-ray diffraction patterns. More specifically, it is directed to novel means for obtaining X-ray diffraction patterns of powdered substances under various conditions of temperature and pressure and in the presence of various fluid materials.

It is well known to the art to study the X-ray diffraction patterns of various crystalline materials by placing a powdered sample of the crystalline material in front of a collimated X-ray beam such that the X-rays are diffracted onto various portions of a photographic film for a period of time sufficient to cause blackening of the film upon development. The extent to which various portions of the film are blackened by the diffracted X-ray beam offers a means of measuring the intensity of the beam components at such points. Conventional methods of carrying out X-ray diffraction studies on powdered crystalline materials are well known to the art and need not be described here. An X-ray diffraction unit, such as that known as "Norelco Type No. 12031" X-ray diffraction apparatus, manufactured by North American Phillips Company, Incorporated, of New York, N. Y., is a typical example of an apparatus in which X-ray diffraction patterns of crystalline materials may be determined. Such an instrument is described in the November 1944 edition of "Metals and Alloys."

The powder method for testing the X-ray diffraction characteristics of various materials is an extremely useful qualitative tool in both physics and chemistry. Indeed, careful calibration of the instrument in conjunction with a recording microphotometer permits the quantitative analyses of certain types of materials. As a rule, finely powdered material which is to be studied is drawn into a hollow fiber having an internal diameter of from 0.2 to 0.4 mm. and a length of about 2 to 3 mm. The procedure employed for filling the fibers is necessarily of such nature that the material being analyzed is usually kept at room temperature and exposed to the atmosphere during the filling operation. The material is also exposed to the atmosphere in most conventional diffraction studies during the time that it is subjected to X-rays. Some investigators have found that X-ray diffraction studies can be carried out at extremely high temperatures when employing special types of apparatus. One such method has been disclosed in the literature (National Bureau of Standards Technical News Bulletin, volume 31, No. 5, May 1947).

None of the methods described in the literature have shown a mode of studying the chemical and/or physical changes occurring in various crystalline materials at temperatures ranging from subatmospheric to superatmospheric and in the presence of a fluid material which is maintained at various pressures. In the field of catalysis, for example, it has often been found that a so-called catalytic material which is to be employed for accelerating a particular type of reaction is not the catalyst per se when placed in a reaction zone. Indeed, it is often necessary to subject the material to various types of treating operations in the reaction zone before it is active as catalyst. As an example, it may be mentioned that such materials as oxides of the iron group (iron, cobalt, and nickel) of the periodic table when promoted with certain types of promoters, such as the oxides and carbonates of potassium, and the like, are excellent catalysts for the synthesis of hydrocarbons and oxy organic compounds from carbon monoxide and hydrogen only after the material has been subjusted to a pretreating operation with carbon monoxide and/or hydrogen or other types of pretreating gas. It is surmised then that the promoted iron oxide as placed in the reaction zone is not the catalyst but that various physical and/or chemical changes occur during the pretreating step which results in the production of an active synthesis catalyst.

Investigators have been handicapped in that it has been difficult to determine just what is the active ingredient of such catalytic materials. It would be extremely desirable, therefore, to have available a means for studying the behavior of such materials not only under pretreatment conditions but also under actual reaction conditions. The field of X-ray diffraction offers a potential means of studying such physical and/or chemical changes in catalytic substances. Unfortunately, however, it is not sufficient simply to study the X-ray diffraction pattern of a potentially active catalyst at atmospheric temperature and pressure conditions, nor is it satisfactory to study the modifications occurring in the catalytic material by obtaining X-ray diffraction patterns at several different temperatures. The solution to the problem lies in providing a means for studying the X-ray diffraction pattern of a potentially active catalyst under operating conditions approximating those required to produce an active catalytic material under actual operating conditions. This means that in certain cases the X-ray diffraction pattern of a substance to be studied must be obtained while the substance is not only at an elevated temperature but also while the substance is in the presence of a fluid material, which is not necessarily air, and under extremely high pressures, or in some cases, under pressures much below atmospheric pressure. Because of the physical limitations imposed on one attempting to study such conditions with X-ray diffraction apparatus known to the prior art, it is obviously not possible to carry out such studies on a scale comparable to those used in carrying out laboratory, pilot unit, or plant unit operations.

It is, therefore, the main object of the present invention to provide a novel apparatus and method for carrying out X-ray diffraction studies of powdered substances under various conditions of pressure and temperature and in the presence of various fluid materials.

It is another object of the present invention to provide a means of determining X-ray diffraction patterns of substances in the presence of a fluid material and under selected conditions of temperature and pressure in a microreactor constructed of material which does not interfere to any appreciable extent with the X-ray diffraction patterns obtained from the substance to be investigated.

Other objects of the present invention will become apparent from a careful consideration of the following description when taken together with the accompanying drawings.

Briefly, the present invention comprises providing a capillary or microreactor element constructed of beryllium, magnesium or aluminum or alloys consisting of these metals into which a specimen of powered substance to be tested is placed and a camera in which the microreactor is positioned, directing a collimated beam of X-rays on the microreactor such that both reflected and transmitted X-rays may be recorded on a film in the camera, a means of supplying a fluid substance under a desired pressure to the microreactor, means for adjusting the temperature of the contents of the microreactor and, if desired, means for collecting the fluid effluent from the microreactor.

Several problems are encountered in carrying out X-ray diffraction studies on powdered substances which are maintained at various temperatures in the presence of a gasiform material under either high or low pressures. An extremely small amount of substance must be used in order that a distinct diffraction pattern may be obtained. The microreactor must be able to withstand extreme pressures and temperatures, must not absorb X-rays to any marked extent, and should not diffract X-rays to such an extent as to interfere with the diffraction pattern of the substance being tested. In addition, the reactor equipment should not radiate sufficient heat to harm the photographic film employed in the camera when high temperatures are employed.

It is known that light metals, those having a low atomic number, absorb X-rays only very slightly as compared to metals having high atomic numbers.

This is particularly true when employing soft X-rays (those having long wave lengths) for obtaining the diffraction patterns. Beryllium is a metal which meets the above requirements. It has a low atomic number and, hence, absorbs soft X-rays only very slightly. It is a metal having a high melting point (about 2343° F.) and the hardness of mild steel. Although it is somewhat brittle, it may be machined, providing the proper care is taken. In addition, beryllium is inert because its oxide forms almost immediately in contact with the atmosphere. This provides some protection to the beryllium itself. It is true that beryllium diffracts excellently. However, its X-ray diffraction pattern is quite simple and of sufficiently different character from the patterns of most substances so as not to interfere to any great extent with the diffraction pattern of the material being tested. I have found that beryllium may be machined into a microreactor which accomplishes the objects heretofore described, and thus provides a very convenient tool for studying the physical and/or chemical changes occurring in various substances under a wide variety of conditions.

In addition to beryllium, the metals magnesium and aluminum may be used in constructing the capillary. The latter metals have fairly low atomic numbers but they are heavier than beryllium and, hence, have a somewhat higher linear absorption coefficient than beryllium. These metals, however, are machineable and may be used as microreactors under some conditions.

The present invention will now be described in detail in conjunction with the drawings in which Fig. 1 is a simplified sketch of a side view of an X-ray diffraction apparatus constructed in accordance with the present invention comprising a source of X-rays, a diffraction camera, a microreactor, and means for supplying a gasiform material to the microreactor under various temperature and pressure conditions;

Fig. 2 is a top view of the diffraction camera including the microreactor of the present invention; and, Fig. 3 shows a side view in section of the microreactor of the present invention together with its auxiliary equipment.

Turning now to Fig. 1, the numeral 11 designates an X-ray target which is constructed of suitable metal and positioned in a conventional X-ray tube. X-ray beam 12 is directed to a suitable hole 13 in one side of camera 15. Camera 15 may be a circular metal disc of a type conventional to the art which acts as a holder for a photographic film around the entire portion of the inner wall of the camera. The X-ray beam 12 passing into hole 13 is collimated in aperture system 16 and is directed on the center portion of microreactor 17. The construction of the microreactor will be described in more detail hereinafter. The portion of the X-rays not diffracted by substances in microreactor 17 pass to an X-ray beam collector 18 which contains lead or leaded glass for stopping the travel of the X-rays. Camera 15 is supported on suitable adjustable legs such as 19 and 20.

The numeral 21 designates a line through which a gasiform material is supplied under high pressure, indicated by pressure measuring means 21', to microreactor 17. The gas may be supplied from a high pressure steel bomb or other means which contains the gas at a pressure somewhat higher than that desired to be maintained in the microreactor. A conventional pressure regulator may be placed on the bomb or other means containing the gasiform material such that the pressure of gas supply to the microreactor is maintained at a desired level. A suitable line 22 leading from the effluent side of microreactor 17 contains a valve or clamping means 23 which permits controlling the rate of flow of gasiform material to reactor 17 and at the same time reduces the pressure of gas in line 22 from a high pressure down to atmospheric pressure. The gasiform effluent from reactor 17 passes at atmospheric pressure from line 24 to sampling means 25. Line 24 is connected to an inlet 26 on sampling means 25 by a flexible connection 27. Sampling means 25 may be graduated and may suitably be filled with a liquid which does not absorb to any appreciable extent gasiform fluids present in the effluent from reactor 17. A saturated aqueous solution of magnesium sulfate may be used to fill sampling means 25. Sampling means 25 contains valve 28 and a suitable opening 29 which is placed below the level of additional saturated solution of magnesium sulfate in container 27. It is, thus, possible, by regulating pressure and flow rate controlling means 23, to determine the rate at which gases pass through reactor 17 by observing the rate at which sampling means 25 is emptied of the solution contained therein. The outlet 29 on sampling means 25 may be of suitable size such that the container, when completely full of gasiform material received from reactor 17, may be placed on the sample receiver of a mass spectrometer so that spectrometric analysis of the gases contained therein may be carried out.

The microreactor 17 and its contents may conveniently be heated by applying a current to lines 21 and 22, which may be made of copper or other electrically conducting metals through electrical leads 1 and 2 containing contacts 8 and 9, respectively. These leads are connected to the secondary coil 4 of transformer 3. Primary coil 5 of transformer 3 is electrically connected to a variable resistance element 6 which in turn is connected to a source of A. C. voltage. By applying currents as high as 400 amperes at about 0.6 volt through leads 1 and 2, it is possible to heat reactor 17 to any desired temperature below the melting point of beryllium. It may be observed that reactor 17, having a much smaller cross sectional area than lines 21 and 22, acts as a resistance to current applied through leads 1 and 2 and is heated to a much greater extent than are lines 21 and 22 or other portions of metallic equipment between contacts 8 and 9.

Turning now to Fig. 2, a top view is shown of the camera and microreactor described in Fig. 1. It is seen that target 11 generates a beam of X-rays shown by the numeral 12 into collimating means 16 from whence the collimated beam of X-rays passes to microreactor 17. X-rays which are not diffracted by the substance contained in reactor 17 pass to beam collecting device 18. Camera 15 contains film 30 which is concentric with the substance contained in reactor 17 and which has a desired radius with respect to the position of reactor 17. X-rays which are diffracted by transmission through the powdered sample in reactor 17 are shown as beams designated by the numeral 31 while the reflected X-ray beams are designated by the numeral 32.

Turning now to Fig. 3, a detailed sectional side view of the microreactor and auxiliary equipment are shown. The numeral 17 designates the microreactor which, as previously mentioned, is preferably machined from beryllium metal. The central portion of microreactor 17 may have an outside diameter of about 0.05 inch while bore 57 in the reactor may have a diameter of 0.02 inch, leaving the walls of the reactor with a thickness of approximately 0.015 inch. The reactor may suitably be about 0.5 inch in length. Each end of the reactor is shown as being enlarged so as to fit in a suitable housing and clamping device to be described hereinafter. Each end portion may have an outside diameter of approximately 0.19 inch. The bore in each end of the reactor, shown by the numerals 36 and 44, is enlarged in the shape of a frustrum of a cone to facilitate placing powdered substance in reaction zone 57. While the particular dimensions of the microreactor will remain a matter of choice, it has been found that the thickness of the wall and the diameter of the bore in the center portion of the microreactor are quite critical. The wall must not be of sufficient thickness to cause interference in obtaining representative diffraction patterns of various substances to be studied but must be sufficiently strong to withstand high pressures. As a rule, the wall thickness should be in the range of 0.01 inch to 0.015 inch and the diameter of the bore 57 should be in the range of 0.01 to 0.02 inch.

Each end of microreactor 17 fits into suitable housings 33 and 47, respectively, which may be machined from copper, brass, or other metal. Line 21 projects through the center portion of housing 33 and is positioned therein by means of threaded joint 34 such that opening 35 in pipe 21 is aligned with opening 36 in reactor 17. Opening 36 is in fluid communication with the opening in line 21 through opening 37 in housing 33 and orifice 56 in metal disc 55. A circular clamping device 38 contains threaded joint 39 which fits into the threaded portion 39 of housing 33. Circular ferrule or bushing 40 fits snugly around the outer portion of the end of reactor 17 such that, upon tightly screwing clamping device 38 on housing 33, a tight fit is made between ferrule 40, housing 33, and reactor 17 preventing gas under either high or low pressure and/or temperature from leaking around the various joints.

Housing 33 contains inlet 41 and outlet 42 which lead to a space 43 surrounding line 21, said space being defined by housing 33. A liquid cooling or heating medium may thus be introduced through line 41 to maintain line 21 and its contents at any desired temperature by circulation through space 43. The liquid is removed from space 43 through line 42. Line 21 serves two functions. One function is to introduce a gasiform material into reactor 17 at any desired pressure. This line may also act as a conductor for carrying current to reactor 17 as previously described.

The upper end of reactor 17, shown in Fig. 3, may be constructed in a manner similar to the lower end. Housing 47 contains threaded connection 50 on which may be screwed clamping device 51. Circular ferrule or bushing 52 fits around the large portion of the upper end of reactor 17 such that upon tightening clamping device 51, a gas-tight fit is made between reactor 17, housing 47 and ferrule 52. It is seen that opening 49 of line 22 is aligned with opening 44 of reactor 17 and these two openings are fluidly connected by opening 53 in housing 47 and orifice 46 in disc 45. Housing 47 may also contain an inlet and an outlet for cooling or heating fluid similar to that previously described. For the sake of brevity the extreme upper portion of housing 47 is not herein described in detail. Ferrules 40 and 52 may suitably be constructed of copper or other such metal which will permit making a tight fit around the ends of the reactor. Lines 21 and 22 are preferably also constructed of copper. Housings 33 and 47 and clamping devices 38 and 51 may, if desired, be constructed of brass or other easily machineable metal or alloy.

In order to carry out X-ray diffraction studies on powdered solids at various temperature conditions, it is necessary first to calibrate the apparatus to determine the current to be charged to line 21 and 22 in order to heat reactor 17 and its contents to various desired temperatures. The empty reactor is first clamped in its housing device and a fine wire-type thermocouple is placed in the center portion of reaction zone 57. Liquid coolants are then passed through zones 43 and 54 in housing devices 33 and 47, respectively, and then an electric current is passed through lines 21 and 22. The amount of current required to heat the center portion of reactor 17 to any desired temperature is then determined to obtain a calibration that may be used in subsequent studies.

The diffraction pattern of the beryllium microreactor itself is then obtained by placing the reactor in the path of a collimated X-ray beam having the wave lengths desired to be used in subsequent studies. This is done by placing a film in camera 15 as heretofore described, passing the collimated X-ray beam through the beryllium microreactor for the desired length of time, and subsequently developing the film to determine the diffraction pattern obtained from the beryllium reactor. As previously mentioned, the beryllium diffracts excellently but the diffraction pattern is relatively simple and once obtained may be used as a reference in making subsequent studies of various materials.

The next step is that of powdering the material to be tested and sifting the powdered material through a finely woven silk, wire, nylon, or other type of cloth so that the particles obtained therefrom are substantially uniform in size and contain no large lumps of material. The conical opening in one end of microreactor 17 is then filled with glass wool and the powdered material is placed in the other end and tamped into reaction zone 57 by means of a small wire or other means. After the reaction zone 57 has been substantially filled with powdered material, a small piece of glass wool or the like is placed in the other conical opening and the microreactor is placed in position with respect to the various housing devices and clamps as heretofore described. The reactor is then positioned in the center of camera 15 and connections are made to a source of gasiform material, a sampling means for collecting effluent gases, and electrical heating means. Gaseous material under a desired pressure is then passed through line 21, reactor 17 and line 22 to flush the system free of air. Current is then passed through leads 1 and 2 such that reactor 17 and the powdered material therein are heated to a desired temperature. During the period that the reactor is being heated, liquid cooling material such as water or the like is passed through housings 33 and 47 to prevent these portions of the equipment from becoming too hot.

A collimated beam of X-rays is then directed on reactor 17 and exposure of the film is initiated. The exposure period may be continued for a time sufficient to obtain definite diffraction patterns on the film. It may be desired, for example, to obtain first the diffraction pattern on a sample of powdered solid material under room temperature conditions and then to obtain the diffraction pattern of the same sample under elevated temperature and pressure conditions in the presence of various fluid materials. After a period of two or three hours, for example, the collimated beam of X-rays travelling through hole 13 may be shut off or deflected away from the camera by suitable means, the film removed from camera 15, and the film developed. A new film may then be put in camera 15, and, with the X-ray beam directed on reactor 17, a run may be made under different temperature or pressure conditions or in the presence of another type of gasiform material. If desired, a new diffraction pattern may be obtained under the same operating conditions previously employed in order to determine whether the physical and/or chemical characteristics of the powdered material changes to any appreciable extent as the reaction is continued for long periods of time. In other cases, it may be desired to obtain a diffraction pattern on a specimen during very long periods of reaction, such for example 24 to 48 hours or even longer, and then to compare this diffraction pattern with one obtained from a similar specimen which has been treated under somewhat different conditions of temperature and pressure or in the presence of a different gasiform material.

A particularly useful application of the X-ray diffraction apparatus employed in accordance with the present invention is that of studying the characteristics of various types of catalysts used in the Fischer-Tropsch synthesis operation. It is well known that active Fischer-Tropsch synthesis catalyst may be prepared by forming a mixture comprising an oxide of one of the metals of the iron group, such as iron, cobalt, or nickel, and promoting the material with such promoters as the oxides or carbonates of one of the alkali or alkaline earth metals. The material is not active as a catalyst when a mixture of carbon monoxide and hydrogen is first passed therethrough at what would normally be considered as active conditions for synthesizing hydrocarbons and oxy organic compounds. The solid material must first be subjected to a pretreating operation for relatively long periods of time with hydrogen and/or carbon monoxide before an active catalyst is prepared. The apparatus of the present invention offers a convenient method of studying the physical and/or chemical characteristics of the solid material before activation, during the activation period, and during the actual synthesis operation. In one instance, a specimen of $Fe_2O_3$ catalyst promoted with 5% potassium oxide, which was known from previous synthesis operations to produce high yields of hydrocarbons and oxy organic compounds after proper activation treatment, was studied in the apparatus of the present invention. The X-ray diffraction pattern of the composition was first determined by directing a beam of X-rays from an iron target on a small amount of the specimen contained in the beryllium capillary at atmospheric conditions of temperature and pressure. A mixture of carbon monoxide and hydrogen in the ratio of one volume of the former to one volume of the latter was then passed through the catalyst sample at a rate of about 1000 volumes of gaseous mixture per volume of catalyst per hour at a pressure of 150 pounds per square inch gauge. Periodically, samples of effluent gas from the beryllium reaction zone were collected and analyzed in a mass spectrometer. The temperature of the catalyst zone was maintained at 550° F. During the first 18 hours that the carbon monoxide and hydrogen was passed over the catalyst, no appreciable reaction took place as indicated by the amount of hydrocarbons and carbon dioxide present in the effluent gas. The X-ray diffraction pattern of the catalyst sample was determined during this activation period, and it was noted that no appreciable changes occurred in the diffraction pattern as compared with the pattern of the composition under atmospheric conditions of pressure and temperature. During the period from 18 to 240 hours of operation, the catalyst became more active as indicated by the presence of hydrocarbons and carbon dioxide in the effluent gas. X-ray diffraction patterns obtained on the catalyst during active synthesis conditions showed the presence of a few faint lines which were not present in the diffraction pattern of the composition before and during the activation treatments. The new lines appearing in the diffraction pattern obtained during the synthesis operations could not be accounted for from any known inorganic crystal modifications of iron or potassium or of these metals combined with other compounds. It was indicated that the iron may be tied up with carbon in a form such as $Fe_2C$, or other carbide or other compound which is not stable under usual atmospheric conditions.

It is readily seen that the apparatus of the present invention opens up a new field for investigating the properties of catalytic materials under conditions comparable to those employed under actual reaction conditons. By studying the X-ray diffraction patterns of a catalytic composition before and during actual reaction conditions, it may be possible to determine why certain compositions produce active catalysts whereas other compositions are completely inactive. By having a more intimate knowledge of the physical and/or chemical changes occurring in catalytic compositions during actual reaction conditions, it will then be possible to predict more accurately new compositions which will be active as catalysts and also to determine methods of increasing the activity of certain types of known catalytic compositions.

It is obvious to a workman skilled in the art that the apparatus of the present invention is not limited to the study of catalytic compositions per se or to the study of physical and/or chemical changes occurring under high temperature conditions. For example, it is possible to study reactions between solid substances and various gasiform and liquid materials in accordance with the procedure as outlined heretofore. Also, by allowing liquid air or nitrogen or other types of coolants to be introduced into chambers 43 and 54 around inlet and outlet tubes 21 and 22, the temperature of the contents of reaction zone 17 may be maintained at those considerably below atmospheric temperature if it is desired to study physical and/or chemical changes under extremely low temperatures at either high or low pressures. Likewise, a suitable evacuating system may be employed for maintaining the reaction zone under extremely low pressures when passing therethrough various fluid materials at high or low temperatures.

I do not intend to be limited to various applications for or modifications of the apparatus of the present invention. Many other modifications will be obvious to one skilled in the art. It is emphasized, however, that the successful application of the apparatus of the present invention is dependent to a large extent on the size of the microreactor. The inside diameter of the microreactor should be below about 0.025 inch and preferably in the range of from about 0.01 to 0.02 inch. If a smaller bore is used in the microreactor, it is extremely difficult to place finely powdered materials therein. If larger diameters are used for the inside bore, the diffraction patterns may produce broad lines on the film which are difficult to interpret and which do not have the sharpness obtained when employing smaller amounts of materials. The thickness of the wall of the microreactor is preferably maintained in the range of 0.01 to 0.015 inch, smaller thicknesses not having sufficient strength to withstand high pressures, and greater thicknesses causing distortion of the X-ray diffraction pattern and causing the metal to interfere with the diffraction pattern obtained from the material to be tested. Such dimensions will vary depending on the alloy or metal used in the construction of the reactor.

Beryllium has a high melting point, about 2343° F., and does not tend to soften before this temperature is reached. Hence, the melting point of beryllium is the upper temperature limitation with respect to its use as a capillary material. Magnesium and aluminum have melting points of about 1200° F. and 1220° F., respectively; hence, care should be taken not to use capillaries made of the metals at excessive temperatures. Alloys of any two or of all three of the above metals will have varying properties, and the particular range of conditions that may be employed in an alloy reactor will depend on the properties of the alloy. By employing coolants, such as liquid air or nitrogen, extremely low temperatures may be obtained which makes the apparatus suitable for the study of various substances over a wide temperature range. Pressures of from several millimeters of mercury up to as high as 20 atmospheres or even higher may be employed. The control of the flow of gas through the microreactor is important. Special precautions must be taken such that gas or liquid rates as low as 0.1 to 4 or 5 cc. per hour may be passed through the reactor under various pressures.

Although I have described the invention as being suitable for use with a conventional X-ray diffraction camera, it is within the scope of the present invention to employ Geiger-Müller counters for the diffraction measurements. The application of Geiger-Müller counters to X-ray diffraction work has been disclosed in U. S. Patent 2,386,785 to Friedman which issued October 16, 1945. The use of a Geiger-Müller counter rather than a photographic film for recording the relative intensities of a portion of an X-ray diffraction pattern may be preferred in some instances where it is desired to speed up the taking of the readings, or in cases where extremely high temperatures are employed which might deleteriously affect photographic film. My invention is not intended to be restricted to the use of a photographic film or of Geiger-Müller counters or any other related apparatus for determining the intensity of radiations of X-rays transmitted through or reflected from substance in the beryllium microreactor.

It is also to be understood that the present invention is not restricted to the use of any particular target material in the X-ray tube. Target materials such as iron, copper, and the like may be employed. Generally, it is preferred to employ an X-ray tube which emits soft radiation (long wave length X-rays) in order to get a wide spacing between diffraction lines. The selection of the particular X-ray tube will depend entirely on the type of material being analyzed and the type of metal or alloy used in making the reactor. In some cases, it may be desirable to study the characteristics of powdered solid materials under various conditions when using both short and long wave length X-rays.

The nature and objects of the present invention having been fully described and illustrated, what I wish to claim as new and useful and to secure by Letters Patent is:

1. In an apparatus of the character described including a source of X-ray radiation, means for forming a collimated beam of X-rays, and means for recording X-rays diffracted from said collimated beam, the improvement which comprises a thin-walled tubular element having a capillary bore adapted to contain a powdered solid, said tubular element being constructed from a solid material capable of withstanding preselected conditions of temperature and pressure and capable of passing X-rays without marked absorption thereof and said element being arranged transverse said collimated beam, a first conduit sealed to one end of said tubular element and adapted to convey fluid reaction material into said bore, a second conduit sealed to the other end of said tubular element and adapted to convey fluid reaction material out of said bore, means connected to said first conduit for supplying fluid reaction materal thereto, and means connected to said second conduit for adjusting pressure therein whereby diffraction characteristics of the powdered substance contained in said bore may be determined in the presence of a fluid reaction material at a selected pressure.

2. In an apparatus of the character described including a source of X-ray radiation, means for forming a collimated beam of X-rays, and means for recording X-rays diffracted from said collimated beam, the improvement which comprises a thin-walled metal tubular element having a capillary bore adapted to contain a powdered substance, said metal being selected from the group consisting of berryllium, magnesium, aluminum and alloys consisting of said metals and said tubular element being arranged transverse said collimated beam, a first conduit sealed to one end of said tubular element and adapted to convey fluid reaction material into said bore, a second conduit sealed to the other end of said element and adapted to convey fluid reaction material out of said bore, means connected to said first conduit for suplying fluid reaction material thereto, and means connected to said second conduit for adjusting pressure therein whereby X-ray diffraction characteristics of the powdered substance contained in said bore may be determined in the presence of a fluid reaction material at a selected pressure.

3. An improved apparatus according to claim 2 and including means for adjusting the temperature of said tubular element.

ROBERT WARREN LONG.

REFERENCES CITED

The following references are of record in the file of this patent:

UNITED STATES PATENTS

| Number | Name | Date |
| --- | --- | --- |
| 2,347,424 | Machlett | Apr. 25, 1944 |

OTHER REFERENCES

An X-ray camera for powdered diagrams at any temperature by N. W. Taylor, Review of Scientific Instruments, Nov. 1931, pp. 751–755.

A high temperature X-ray camera for precision measurements, by A. H. Jay, Physical Society of London Proceedings, vol. 45, 1933.

High temperature X-ray camera, in Journal of Applied Physics, vol. 14, p. 137, Mar. 1943.

Structure of Metals, by C. S. Barrett, McGraw-Hill Book Company, 1943.